(12) United States Patent
Stahl et al.

(10) Patent No.: US 8,597,392 B2
(45) Date of Patent: Dec. 3, 2013

(54) FILTER ARRANGEMENT WITH OVERLAPPING SWORDS

(75) Inventors: Ulrich Stahl, Laudenbach (DE); Uwe Felber, Abtsteinach (DE); Claudio Marin, Heidelberg (DE)

(73) Assignee: Carl Freudenberg KG, Weinheim (DE)

( * ) Notice: Subject to any disclaimer, the term of this patent is extended or adjusted under 35 U.S.C. 154(b) by 225 days.

(21) Appl. No.: 12/957,435

(22) Filed: Dec. 1, 2010

(65) Prior Publication Data

US 2011/0131938 A1 Jun. 9, 2011

(30) Foreign Application Priority Data

Dec. 4, 2009 (DE) .................. 10 2009 056 759

(51) Int. Cl.
*B01D 46/00* (2006.01)

(52) U.S. Cl.
USPC ..................... 55/497; 55/502; 55/DIG. 31

(58) Field of Classification Search
USPC .................................................. 55/497, 552
See application file for complete search history.

(56) References Cited

U.S. PATENT DOCUMENTS

| | | | |
|---|---|---|---|
| 3,873,288 A * | 3/1975 | Wachter et al. | 55/497 |
| 4,227,953 A * | 10/1980 | Wasielewski et al. | 156/227 |
| 4,488,966 A * | 12/1984 | Schaeffer | 210/485 |
| 4,509,958 A * | 4/1985 | Masuda et al. | 96/60 |
| 4,617,122 A * | 10/1986 | Kruse et al. | 210/493.3 |
| 4,708,724 A * | 11/1987 | Agnew | 55/500 |
| 5,888,442 A | 3/1999 | Kometani et al. | |
| 6,045,598 A * | 4/2000 | Fath et al. | 55/490 |
| 6,045,599 A * | 4/2000 | Solberg, Jr. | 55/498 |
| 7,540,897 B2 | 6/2009 | Stahl et al. | |
| 2002/0020156 A1 | 2/2002 | Goerg | |
| 2005/0039427 A1 | 2/2005 | Karlsson | |
| 2009/0056293 A1* | 3/2009 | Styles | 55/385.3 |

FOREIGN PATENT DOCUMENTS

| | | |
|---|---|---|
| EP | 1434641 B1 | 1/2006 |
| EP | 1 640 055 A1 | 3/2006 |

* cited by examiner

*Primary Examiner* — Duane Smith
*Assistant Examiner* — Phillip Shao
(74) *Attorney, Agent, or Firm* — Leydig, Voit & Mayer, Ltd.

(57) ABSTRACT

A filter arrangement for filtering intake air of a vehicle engine includes a filter element including a folded filter medium having a plurality of lengthwise folds, each fold having a fold wall and a fold valley so as to form a plurality of fold walls and fold valleys. the arrangement further includes a filter housing accommodating the filter element and having a top and a bottom part, a first insertable lamella disposed on the top part, and a second insertable lamella disposed on the bottom part and extending into a first one of the plurality of fold valleys, wherein the first insertable lamella extends into an adjacent one of the plurality of fold valleys so as to compress the fold wall disposed between the first fold valley and the adjacent fold valley.

9 Claims, 1 Drawing Sheet

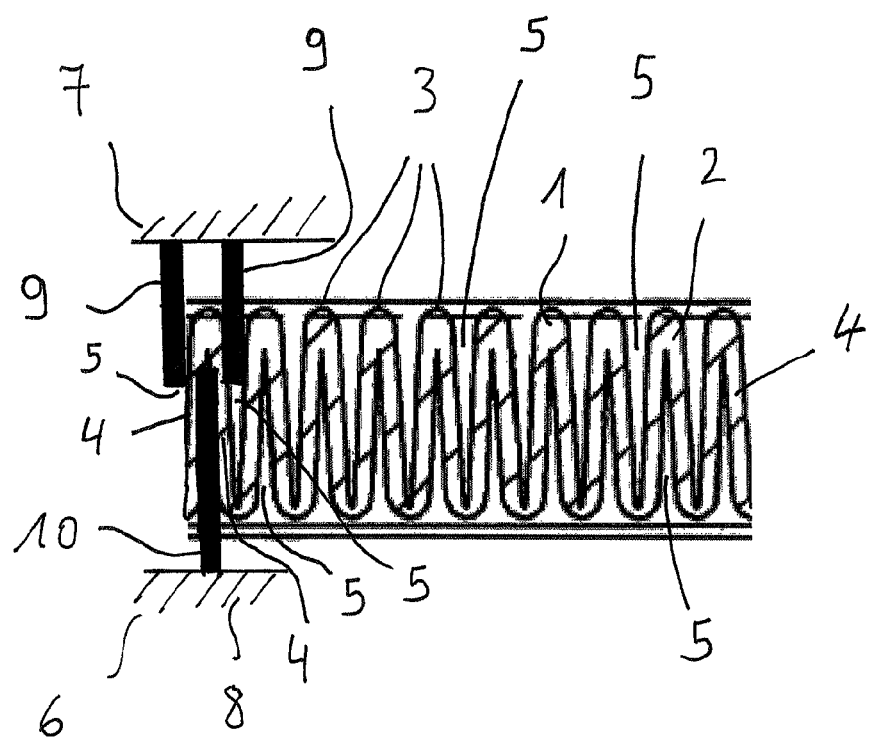

FILTER ARRANGEMENT WITH OVERLAPPING SWORDS

CROSS REFERENCE TO PRIOR APPLICATIONS

Priority is claimed to German Application No. DE 10 2009 056 759.3, filed Dec. 4, 2009, the entire disclosure of which is incorporated by reference herein.

FIELD

The invention relates to a filter arrangement for filtering the intake air of a vehicle engine, comprising a filter element with a folded filter medium, whereby the folded filter medium has lengthwise folds having fold walls and fold valleys, and comprising a filter housing to accommodate the filter element, whereby the filter housing has a top part and a bottom part.

BACKGROUND

European patent application EP 1 640 055 A1 discloses a filter arrangement of the above-mentioned type. The filter element is accommodated in a filter housing consisting of a top part and a bottom part. Here, the filter element separates an unfiltered-air side from a filtered-air side. In this filter arrangement, insertable lamellae extend into the fold valleys of adjacent folds of the filter element. The extension of the insertable lamellae into the fold valleys is supposed to achieve a very low rate of air leakage between the unfiltered-air side and the filtered-air side.

A disadvantage of this sealing concept is that the length of the insertable lamellae has to be coordinated very precisely with the depth of the fold valleys in order to establish close contact of the insertable lamellae with the filter element.

SUMMARY OF THE INVENTION

Therefore, an aspect of the invention is to provide a sealing means and to prevent dust from passing from the unfiltered-air side to the filtered-air side.

Accordingly, a first insertable lamella is arranged on the top part, while a second insertable lamella is arranged on the bottom part, whereby at least one insertable lamella extends into a fold valley and whereby the insertable lamellae compress a fold wall between them.

According to the invention, it has been recognized that overlapping insertable lamellae that are arranged on the unfiltered-air side and on the filtered-air side can grip around the two adjacent folds of a filter element and compress them between them. An individual insertable lamella does not have to be laboriously coordinated with the depth of the appertaining fold valley into which it projects. Rather, the compressibility of the filter medium, which preferably consists of a nonwoven material, is utilized to compress a fold wall. Compressing the fold wall increases the tightness. In this manner, the sealing concept of the state of the art is improved and the passage of dust from the unfiltered-air side to the filtered-air side is prevented with a very high degree of reliability.

Before this backdrop, several insertable lamellae can be arranged on the top part and/or on the bottom part. Preferably, two insertable lamellae are arranged on one of these two parts while one insertable lamella is arranged on the opposite part. As a result, it is possible to compress two fold walls that delimit a fold valley.

The first insertable lamella could have a first edge while the second insertable lamella could have a second edge, whereby the first and the second edges are oriented parallel to each other and exert a linear pressure onto the fold wall. This linear pressure achieves a surprisingly high degree of tightness.

The fold walls could be made of a compressible nonwoven material that can be compressed to at least 50% of its thickness in the unloaded state. In order to attain sufficient tightness on the compressed fold wall, the fold wall has to have a compressibility of at least 50% of its initial material thickness in the unloaded state.

In this context, a fold wall could have a thickness of at least 2 mm in the unloaded state. This thickness has proven to be sufficient to obtain excellent tightness and adequate filtering capacity.

There are several different ways to advantageously configure and refine the teaching of the present invention. Towards this end, reference is hereby made, on the one hand, to the claims below and, on the other hand, to the following explanation of a preferred embodiment of the invention on the basis of the drawing.

Generally preferred configurations and refinements of the teaching are explained in conjunction with the explanation of the preferred embodiment of the invention on the basis of the drawing.

BRIEF DESCRIPTION OF THE DRAWING

The drawing shows the single FIGURE.

The FIGURE depicts a schematic view of the end side of a filter arrangement having overlapping insertable lamellae.

DETAILED DESCRIPTION

The single FIGURE shows one end side of the filter arrangement for filtering the intake air of a vehicle engine. It comprises a filter element 1 with a folded filter medium 2, whereby the folded filter medium 2 has lengthwise folds 3 having fold walls 4 and fold valleys 5, and it comprises a filter housing 6 to accommodate the filter element, whereby the filter housing 6 has a top part 7 and a bottom part 8. A first insertable lamella 9 is arranged on the top part 7, while a second insertable lamella 10 is arranged on the bottom part 8, whereby at least one insertable lamella 10 extends into a fold valley 5 and whereby the insertable lamellae 9, 10 compress a fold wall 4 between them.

In the concrete embodiment shown in the single FIGURE, two first insertable lamellae 9 are arranged on the top part 7, while a second insertable lamella 10 is arranged on the bottom part 8, whereby two insertable lamellae 9, 10 each extend into adjacent fold valleys 5 and whereby the insertable lamellae 9, 10 compress a fold wall 4 between them. The compressed fold wall 4 separates the two adjacent fold valleys 5. Multiple first insertable lamellae 9, namely, two insertable lamellae 9, are arranged on the top part 7. A second insertable lamella 10 on the bottom part 8 extends between the first insertable lamella 9 so as to overlap and, together with the first insertable lamellae, compresses two fold walls 4.

The first insertable lamella 9 has a first edge and the second insertable lamella 10 has a second edge, whereby the first and second edges are oriented parallel to each other and exert a linear pressure onto the fold wall 4. As can be seen in the single FIGURE, the lamellae 9, 10, and the first and second edges thereof, extend orthogonally from the top part 7 and bottom part 8, respectively, and, while oriented parallel to each other, the edges of the lamellae 9, 10 are not oriented parallel to the fold walls 4, or the planes defined thereby. As also can be seen in the FIGURE, the shape of the lamellae 9, 10 do not correspond to the shape of the fold valleys 5. In the FIGURE, the lamellae 9, 10 are rectangular, while the fold valleys 5 are triangular.

The fold wall 4 is made of a compressible nonwoven material that can be compressed to at least 50% of its thickness in the unloaded state. The fold wall 4 has a thickness of at least 2 mm in the unloaded state.

Regarding other advantageous embodiments and refinements of the teaching according to the invention, reference is hereby made, on the one hand, to the general part of the description and/or, on the other hand, to the patent claims.

The invention claimed is:

1. A filter arrangement for filtering intake air of a vehicle engine comprising:
    a filter element including a folded filter medium having a plurality of lengthwise folds, each fold having a fold wall and a fold valley so as to form a plurality of fold walls and fold valleys;
    a filter housing accommodating the filter element and having a top and a bottom part;
    a first insertable lamella disposed on the top part; and
    a second insertable lamella disposed on the bottom part and extending into a first one of the plurality of fold valleys, wherein the first insertable lamella extends into an adjacent one of the plurality of fold valleys so as to compress the fold wall disposed between the first fold valley and the adjacent fold valley, and wherein first and second edges of the insertable lamellae are orthogonal to the top part and the bottom part.

2. The filter arrangement as recited in claim 1, wherein a plurality of first insertable lamellae are disposed on the top part and a plurality of second insertable lamellae are disposed on the bottom part.

3. The filter arrangement as recited in claim 1, wherein the first lamella includes the first edge and the second lamella includes the second edge, the first and the second edges disposed parallel to each other and configured to exert a linear pressure on the fold wall disposed between the first fold valley and the adjacent fold valley.

4. The filter arrangement as recited in claim 1, wherein the fold wall includes a compressible nonwoven material that is compressible to at least 50% of its thickness in an unloaded state.

5. The filter arrangement as recited in claim 1, wherein the fold wall includes a thickness of at least 2 mm in an unloaded state.

6. A filter arrangement for filtering intake air of a vehicle engine comprising:
    a filter element including a folded filter medium having a plurality of lengthwise folds, each fold having a fold wall and a fold valley so as to form a plurality of fold walls, each of the fold walls defining a plane, and fold valleys;
    a filter housing accommodating the filter element and having a top and a bottom part;
    a first insertable lamella disposed on the top part; and
    a second insertable lamella disposed on the bottom part and extending into a first one of the plurality of fold valleys, wherein the first insertable lamella extends into an adjacent one of the plurality of fold valleys so as to compress the fold wall that is disposed between the first fold valley and the adjacent fold valley by a first edge of the first insertable lamella and a second edge of the second insertable lamella, the first and second edges being parallel to each other and not parallel to the any of the planes defined by the plurality of fold walls.

7. The filter arrangement according to claim 1, wherein a shape of the first and second insertable lamella does not correspond to a shape of the fold valleys.

8. The filter arrangement according to claim 6, wherein the first and second edges of the insertable lamellae are orthogonal to the top part and the bottom part.

9. The filter arrangement according to claim 6, wherein the first insertable lamella extends from the top part to a free end and the second insertable lamella extends from the bottom part to a free end, the free ends including surfaces that extend in a longitudinal direction of the filter element across respective ones of the fold valleys.

\* \* \* \* \*